United States Patent [19]

Diekman et al.

[11] Patent Number: 4,790,207
[45] Date of Patent: Dec. 13, 1988

[54] BICYCLE CONTROL LEVER MOUNTING SYSTEM

[75] Inventors: Robert L. Diekman, Kent; Douglas A. Barchek, Issaquah, both of Wash.

[73] Assignee: Huffy Corporation, Miamisburg, Ohio

[21] Appl. No.: 931,362

[22] Filed: Nov. 14, 1986

[51] Int. Cl.⁴ .................. G05G 1/04; G05G 11/00; F16B 9/00; B25G 3/00
[52] U.S. Cl. .................. 74/523; 280/289 R; 403/379; 403/267; 403/197; 74/489
[58] Field of Search ........ 74/523, 501 R, 551.1-551.8, 74/488, 489, 491, 531; 280/289 R, 280; 403/378, 197, 379, 265, 267; 192/46, 48.3

[56] References Cited

U.S. PATENT DOCUMENTS

| | | |
|---|---|---|
| 1,449,349 | 3/1923 | Pullin . |
| 1,556,411 | 10/1925 | Brown . |
| 3,059,906 | 10/1962 | Powell et al. .................. 254/190 |
| 3,426,614 | 2/1969 | Brilando et al. ............ 280/289 R |
| 3,693,469 | 9/1972 | Ozaki .................................. 74/489 |
| 3,861,234 | 1/1975 | Cristie .................................. 74/489 |
| 4,042,202 | 8/1977 | Molinari ........................... 403/379 |
| 4,046,025 | 9/1977 | Ozaki .................................. 74/489 |
| 4,156,371 | 5/1979 | Juy ...................................... 74/489 |
| 4,223,563 | 9/1980 | Kine .................................... 74/501 |
| 4,434,679 | 3/1984 | Shimano ............................. 74/491 |
| 4,512,612 | 4/1985 | Allard ................................ 403/379 |
| 4,603,875 | 8/1986 | Boughton et al. ............ 280/289 R |
| 4,624,151 | 11/1986 | Huret .............................. 74/501 R |
| 4,627,305 | 12/1986 | Hosokawa ..................... 74/501 R |
| 4,684,281 | 8/1987 | Patterson .......................... 403/197 |

Primary Examiner—Richard E. Moore
Assistant Examiner—Vinh Luong
Attorney, Agent, or Firm—Biebel, French & Nauman

[57] ABSTRACT

A control lever mounting system includes first and second boss members, each shaped to receive a control lever thereon and having a bore shaped to be positioned in registry with a transverse hole in a bicycle frame tube, and a connector pin for joining the first and second boss members together. The pin is shaped to extend through the tube hole and includes opposing end segments shaped to protrude outwardly from the hole and into the bores of the boss members, forming an interference fit, such that the pin holds the boss members against opposite sides of the frame tube. The boss members each include a recess formed on an inner face thereof shaped to receive adhesive for attaching the boss member to the outer surface of the tube, thereby providing an attachment in addition to the press fit engagement between the boss members and connector pin. To assemble the control lever mounting system, the connector pin is placed within the hole of the frame tube, and the boss members are then pressed inwardly against the tube so that the ends of the connector pin form an interference fit with the bores of the boss members.

10 Claims, 1 Drawing Sheet

U.S. Patent	Dec. 13, 1988	4,790,207
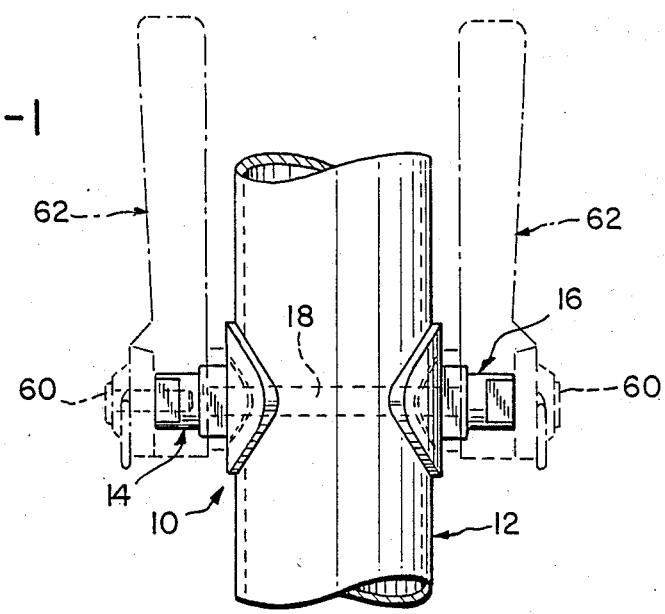
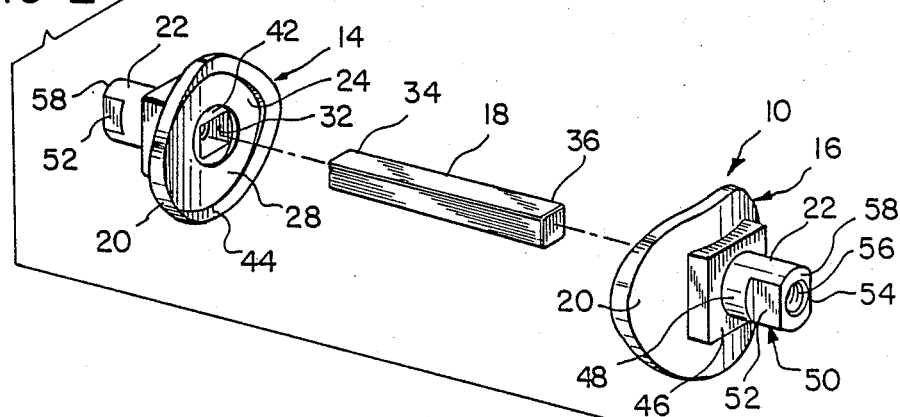
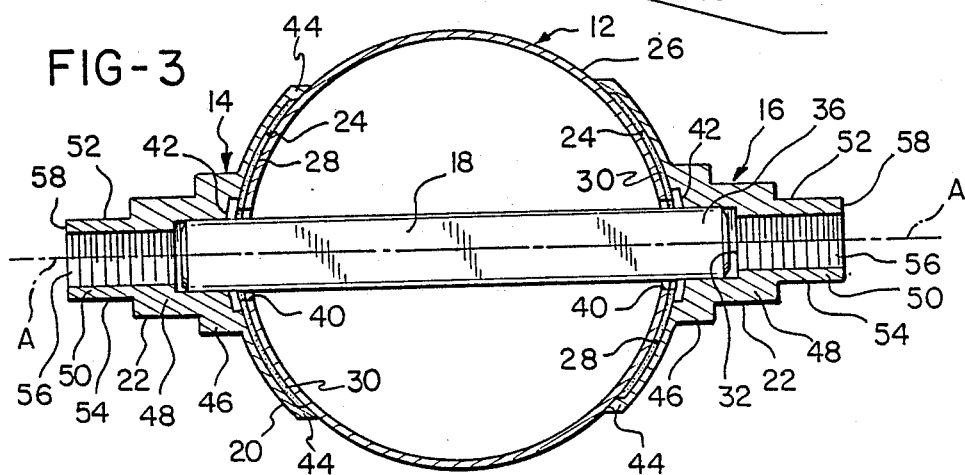

BICYCLE CONTROL LEVER MOUNTING SYSTEM

BACKGROUND OF THE INVENTION

The present invention relates to control lever mounting systems and, more particularly, to control lever mounting systems used to attach speed control levers on bicycle frame tubes.

Although many types of multi-speed bicycles carry speed control levers mounted on their handlebar stems, some types of lightweight racing and touring bicycles include control levers mounted on their frame downtubes. With the latter, the control levers typically are mounted on bosses which protrude sidewardly from the tube along a horizontal axis. The bosses each include a base which is arcuately shaped to conform to the curvature of the downtube and is attached to the tube by brazing or welding. A disadvantage of such construction is that the brazing or welding operation is time-consuming and labor intensive thereby adding measurably to the overall cost of fabricating the bicycle frame.

In an alternate method of mounting speed control levers on the tube of a bicycle frame, a first boss member includes a bore the receives a screw which extends through the tube and threads into a bore of a second boss member. Ashesive is applied to the boss members and tube, and the screw holds the boss members together until the adhesive sets up.

In another known mounting system, the bosses include cylindrical stems that extend into the tube and a complementary connecting member, such as a threaded shank, engages threaded bores in the stems. The bases conforming to the tube wall and covering the tube holes are in the form of washers retained by collars on the bosses. Engagement of the complementary connecting member holds the bosses and bases against the tube. The design of those speed control mechanisms is such that an inordinant amount of manual labor is required to make the threaded connections between the boss members, and such connections are susceptible to fouling.

Accordingly, there is a need for a speed control lever mounting system which is relatively simple in construction and can be mounted directly onto the tube of a bicycle frame with a minimum of manual labor. Furthermore, such a mounting system should be positively attached to the frame tube and able to withstand rugged environmental conditions and vibrations imposed on the bicycle frame.

SUMMARY OF THE INVENTION

The present invention is a control lever mounting system in which the control lever mounting bosses are attached to a bicycle frame tube rapidly and securely. The control lever mounting system includes first and second boss members, each shaped to receive a control lever thereon and having a bore positioned to be in registry with a hole formed through a bicycle frame tube, and a connector pin for joining together the first and second boss members and shaped to extend through the frame tube hole so that its opposing end segments protrude outwardly from the hole and into the bores of the boss members, forming an interference fit.

In the preferred embodiment of the invention, the boss members each include a base having an arcuate inner face shaped to conform to the outer surface of the frame tube, and include a recess shaped to receive an appropriate thickness of adhesive for bonding the boss members to the frame tube, thereby providing a means for attaching the boss members to the tube in addition to the interference fit of the connector pin. The bores which receive the connector pin ends preferably are located to coincide with a central axis of the boss members, and the recesses are concentric with the bores, thereby leaving a peripheral rim about the inner face of the boss members. Also in the preferred embodiment, each boss member includes a second recess of greater depth, contiguous with the bore and concentric with the first recess, to accommodate any burrs that may protrude from the hole in the bicycle frame tube.

Also in the preferred embodiment, the connector pin and bores are rectangular in cross section. This shape is preferable to a round shape in that it resists torsional stresses which might otherwise loosen the interference fit.

The control lever mounting system is attached to a bicycle frame tube by first positioning the connector pin within the transverse hole in the frame tube, then pressing the first and second boss members onto the ends of the connector pin, thereby forming an interference fit between the pin ends and the bores of the boss members. In the preferred embodiment, the attaching method includes the step of applying adhesive to the inner faces of the boss members prior to the pressing step.

Accordingly, it is an object of the present invention to provide a control lever mounting system in which a pair of boss members are held against a frame tube by an interference fit with a connecting pin; a control lever mounting system which is relatively simple in construction and can be attached to a bicycle frame tube relatively easily; and a control lever mounting system in which both an adhesive bond and an interference fit can be utilized to attach the boss members to the frame tube.

Other objects and advantages of the present invention will be apparent from the following description, the accompanying drawings, and the appended claims.

BRIEF DESCRIPTION OF THE DRAWINGS

FIG. 1 is an elevational view of the control lever mounting system, shown mounted on a bicycle frame tube, and in which supported control levers are shown in phantom;

FIG. 2 is an exploded perspective view of the mounting system shown in FIG. 1; and FIG. 3 is an elevational view in section of the mounting system of FIG. 1.

DETAILED DESCRIPTION OF THE PREFERRED EMBODIMENT

As shown in FIGS. 1 and 2, the control lever mounting system of the present invention, generally designated 10, is designed especially for mounting on the downtube 12 of a bicycle frame. The mounting system 10 includes a pair of boss members 14, 16, which are identical to each other, and a connector pin 18.

As shown in FIGS. 2 and 3, each of the boss members 14, 16 includes a disk-shaped base 20 and a boss element 22. An inner face 24 of the base 20 is concave and shaped to conform to an outer surface 26 of the tube 12. The inner face 24 includes a first recess 28 which is of a depth sufficient to accomodate an appropiate thickness of an adhesive 30 for bonding the boss members 14, 16 to the outer surface 26 of the tube 12. An appropriate adhesive is PERMABOND ESP GRADE 110, adhesive manufactured by National Starch and Chemical Corp., Englewood, N.J.

A rectangular bore 32 is formed in the inner face 24 and extends into the boss element 22. The rectangular bore 32 receives end segments 34, 36 of the connector pin 18 which has a rectangular shape in cross-section corresponding to the cross-sectional shape of bores 32. The end segments 34, 36 are sized to provide an interference fit with the bores 32 so that the connector pin 18 holds the boss members 14, 16 against the outer surface 26 of the tube 12. The connector pin 18 extends through a transverse hole 40 formed through the tube 12 and preferably positioned to be parallel to the ground when the tube 12 is incorporated into a bicycle frame.

Each inner face 24 also includes a second recess 42, which is concentric with a central axis A of boss members 14, 16 and is contiguous with the bores 32. The recesses 42 have a greater depth than the first recesses 28 and are shaped to accommodate any burrs that may be protruding outwardly from the outer surface 26 as a result of the formation of the hole 40. The first recess 28 is positioned on the inner face 24 to leave a peripheral ridge 44 about the inner face 24. The peripheral ridge 44 provides a clean, continuous seam between the boss members 14, 16 and the outer surface 26 of the tube 12.

Each of the boss elements 22 includes a block portion 46, a cylindrical portion 48 which is positioned adjacent to the block portion, and eccentric portion 50 adjacent to the cylindrical portion. The eccentric portion 50 is of the same diameter as the cylindrical portion 48, but includes upper and lower flats 52, 54. A threaded hole 56 is tapped into an outer end 58 of the eccentric portion 50 to accomodate a retaining screw 60 shown in phantom in FIG. 1.

The boss elements 22 are of a conventional outer profile and are designed to support conventional control levers 62, shown in phantom in FIG. 1.

The method of attaching the mounting system 10 to the tube 12 is as follows. Prior to the attachment step, the tube 12 is prepared by forming the hole 40, which can be accomplished simply by drilling through the tube. As mentioned previously, it is unnecessary to remove any slight burrs resulting from the drilling operation, since the second recess 42 is shaped to accomodate such burrs in all but extreme cases.

The connector pin 38 is then inserted through the hole 40 and the boss members 14, 16 are positioned such that the bores 32 of the members are in registry with the end segments 34, 36. The boss members 14, 16 are then pressed inwardly toward the tube 12 until their peripheral ridges 44 contact the outer surface 26. With proper sizing of the connector pin 38, the interference fit engagement between the connector pin and boss members 14, 16 is sufficient to hold the boss members against the tube. In one particular application, a zinc/aluminum alloy mounting system included boss members with bores 0.189 inches on a side which received the ends of a connecting pin 0.191 inches on a side in an interference fit.

However, should a more secure connection be desired, the method of attachment is modified to include a step of applying adhesive 30 to the first recess 28 prior to the pressing step. With such a method, the interference fit between the connector pin 38 and boss members 14, 16 is sufficient to hold the boss members in position until the adhesive forms a bond. Consequently, the adhesive may be allowed to harden or cure in an area remote from the pressing station and subsequent to the pressing step, since the interference fit holds the boss members 14, 16 in place with sufficient strength to allow the tube 12 to be transported.

While the pressing operation may be accomplished by any appropriate device, the inventors have employed an arbor press to accomplish the operation.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. In combination with a bicycle frame tube having a transverse hole, a control lever mounting system comprising:

first and second boss members, each shaped to receive a control lever thereon and each including a bore in registry with said hole; and connector pin means joining said first and second boss members together, said pin means extending through said hole and including opposing end segments, each of said end segments protruding outwardly from said hole and into said bore of said boss members, forming an interference fit therewith, whereby said connector pin means holds said boss members against opposite sides of said tube.

2. The mounting system of claim 1 wherein each of said boss members includes an inner face conforming to an outer surface of said tube and enclosing said hole.

3. The mounting system of claim 2 wherein at least said inner face of said first boss member includes recess means for receiving adhesive between said inner face and said outer surface.

4. The mounting system of claim 3 wherein said inner face includes a peripheral ridge contacting said outer surface.

5. The mounting system of claim 3 wherein said inner face of said first boss member includes a second recess of greater depth than the depth of said recess means and contiguous with said bore of said first boss member.

6. The mounting system of claim 1 wherein each of said boss members includes a base having a concave inner face engaging an outer surface of said tube.

7. The mounting system of claim 6 wherein each of said boss members includes a boss element extending from said base, each of said boss elements including a spacer block adjacent to said base, a cylindrical portion adjacent to said block, and an eccentric outer portion adjacent to said cylindrical portion.

8. The mounting system of claim 7 further comprising a control lever pivotally mounted on said boss element.

9. The mounting system of claim 1 wherein said bores and said end segments are substantially rectangular in cross section.

10. In combination with a bicycle frame tube having a transverse hole therethrough, a control lever mounting system comprising:

first and second boss members, each having a base including a concave inner face engaging an outer surface of said frame tube and including a first recess formed in said face, concentric with said base, shaped to accommodate adhesive between said inner face and outer surface, a rectangular bore formed in said face and in registry with said hole and a second recess, of greater depth than said first recess, and a boss element extending from said base and including a spacer block adjacent to said base, a cylindrical portion adjacent to said block, and an eccentric outer portion adjacent to said cylindrical portion;

a connector pin having a rectangular cross section and extending through said tube hole and into said bores of said first and second boss members in an interference fit, thereby holding said boss members against said tube; and adhesive means positioned in said first recess for joining said base to said tube.

* * * * *